United States Patent Office.

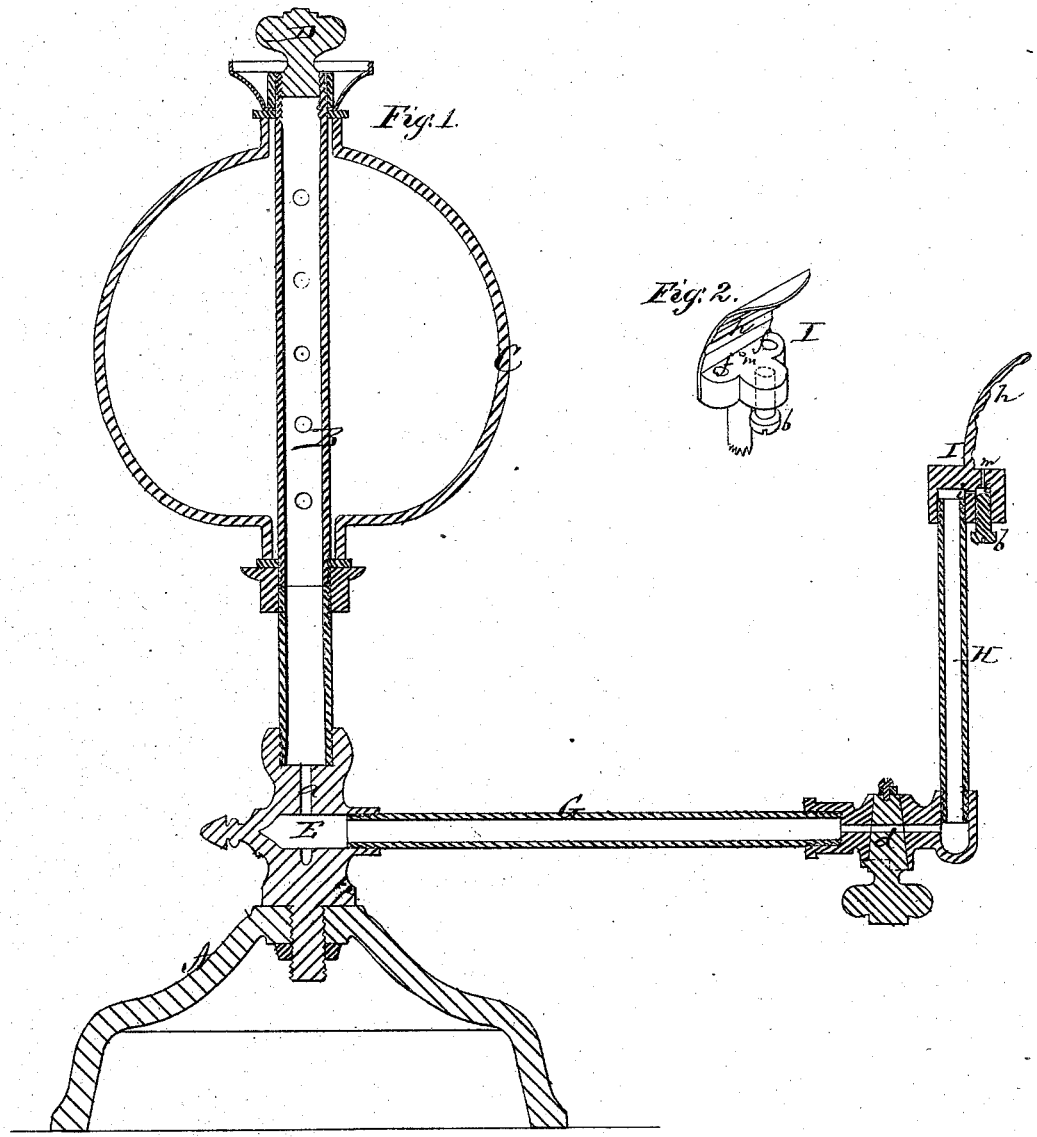

ISAAC KLING, OF SEYMOUR, INDIANA.

Letters Patent No. 100,774, dated March 15, 1870.

IMPROVEMENT IN VAPOR-BURNERS.

The Schedule referred to in these Letters Patent and making part of the same.

*To all whom it may concern:*

Be it known that I, ISAAC KLING, of Seymour, in the county of Jackson, and State of Indiana, have invented certain new and useful Improvements in Portable Gas-Generators; and I do hereby declare that the following is a full, clear, and exact description thereof, reference being had to the accompanying drawings and to the letters of reference marked thereon, which form a part of this specification.

The nature of my invention consists in the construction and arrangement of the burner and heating-plate, as will be hereinafter set forth.

In order to enable others skilled in the art to which my invention appertains to make and use the same, I will now proceed to describe its construction and operation, referring to the annexed drawings, in which—

Figure 1 is a longitudinal vertical section of my generator, and

Figure 2 is a perspective view of the burner and dash.

A represents the stand of the gas-generator, from which rises a pipe, B, to a suitable height.

The upper portion of this pipe is perforated and surrounded by a glass globe, C, and has a stopper, D, screwed into its upper end.

Through the upper end of the pipe B the oil or gasoline is admitted, and passes into the glass globe C, so that it can be seen when the globe is full.

In the upper end of the stand A is a passage, $a$, leading from the lower end of the pipe B into a chamber, E, from which leads a horizontal pipe, G, of suitable length.

At the outer end of the pipe G is a valve, $d$, for shutting off and regulating the supply of oil or gasoline.

Directly beyond the valve $d$, a pipe, H, leads upward, and on the upper end of the same, the burner I is secured.

The pipes G and H are to be filled with cotton, hemp, wire, porous wood, or other sutable material, for limiting the supply of oil. I prefer to use hemp.

In the burner I is a chamber, $e$, where the gas escapes, said chamber being closed up from the bottom with the screw $b$.

The two pockets, $ff$, receive the waste oil which runs out when turned on at escape-hole, and when ignited burns out and heats the burner and then generates its gas.

The heating-plate $h$ of the burner is peculiarly constructed, having grooves running horizontally, as shown in the drawing. These grooves spread the light, and give it brilliancy, taking away, to a great extent, the roaring and steaming noise which is produced by other similar lights.

Inside of the burner, where the pipe H enters the same, there is a small passage or hole, $i$, which connects with the escape-chamber $e$, to pass the gas into the same, from whence it finally passes out through its fine outlet $m$ at the top between the pockets $ff$, as seen in fig. 2.

Having thus fully described my invention,

What I claim as new, and desire to secure by Letters Patent, is—

The burner I, constructed as described, with passage $i$, escape-chamber $e$, screw $b$, outlet $m$, pockets $ff$, and grooved heating-plate $h$, all substantially as and for the purposes herein set forth.

In testimony that I claim the foregoing as my own, I affix my signature in presence of two witnesses.

ISAAC KLING.

Witnesses:
GEORGE GREENE,
ADOLPH W. HILPP.